Oct. 9, 1962  J. W. PROCTOR  3,057,413
PLANT THINNER
Filed Sept. 15, 1960  3 Sheets-Sheet 1

INVENTOR.
JOE W. PROCTOR
BY *Hazard & Miller*
ATTORNEYS

Oct. 9, 1962    J. W. PROCTOR    3,057,413
PLANT THINNER
Filed Sept. 15, 1960    3 Sheets-Sheet 2
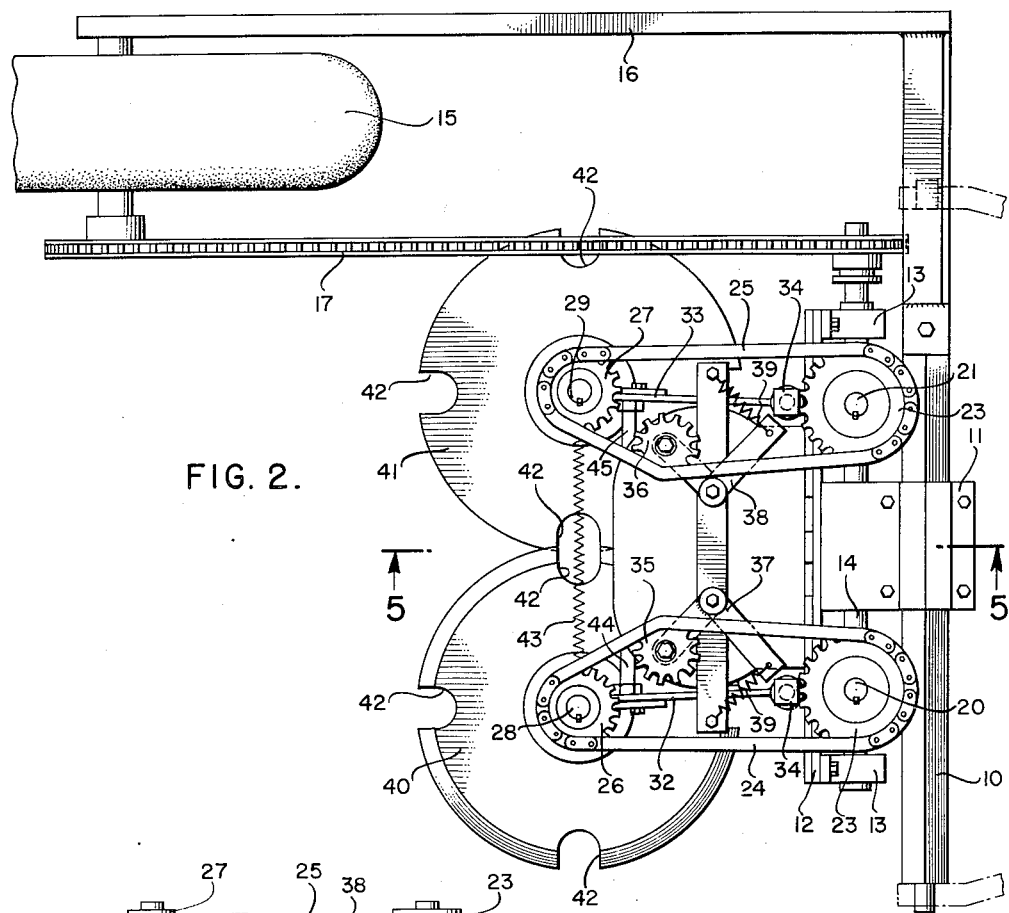
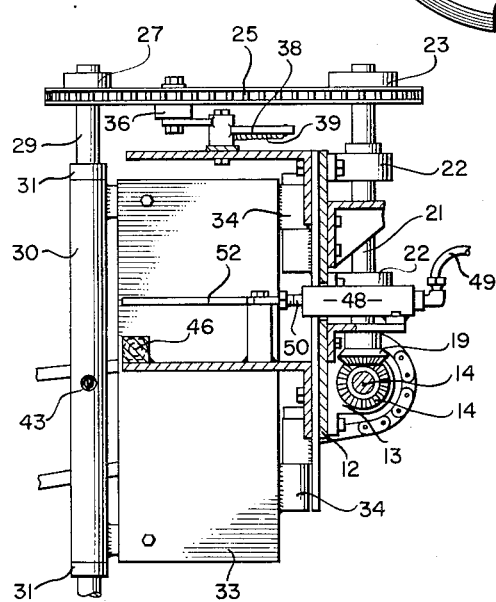
INVENTOR.
JOE W. PROCTOR
BY Hazard & Miller
ATTORNEYS

*INVENTOR.*
JOE W. PROCTOR

United States Patent Office 3,057,413
Patented Oct. 9, 1962

3,057,413
PLANT THINNER
Joe Wess Proctor, P.O. Box 1352, Brawley, Calif.
Filed Sept. 15, 1960, Ser. No. 56,171
6 Claims. (Cl. 172—99)

This invention relates to an apparatus for thinning plants and cutting weeds that may start to grow adjacent the plants.

An object of the invention is to provide an apparatus that can be applied to or mounted upon the tool bar of a conventional tractor and which will be raised or lowered thereby to the proper elevation so that the rotary cutting blades of the apparatus which thin the plants and which destroy adjacent weeds will be kept at the desired elevation with respect to the ground surface. As the tractor proceeds along a row, the apparatus embodying the present invention cuts unwanted plants and weeds a distance below the surface so that these unwanted plants and weeds will not continue to grow. On the rotary blades there are notches which come into mutual registration as the cutters rotate to leave the desired plants.

More specifically, an object of the present invention is to provide an apparatus having the above-mentioned characteristics wherein the rotary cutting blades are so mounted that they are yieldably urged towards each other and towards adjustable stops so that, should the blades encounter some hard and immovable object or an excessive amount of trash, the blades can separate. In so doing, the blades remain in their truly horizontal positions and are not tilted and after having passed beyond the immovable object or trash they can then automatically return to their normal positions.

Still another object of the invention is to provide an apparatus having the above-mentioned characteristics and which has means whereby the rotary blades can be forcibly and intentionally separated by the operator of the tractor. Such separation of the blades may be desirable where the natural growth along a row is so thin that all of the wanted plants should be retained and none destroyed.

With the foregoing and other objects in view, which will be made manifest in the following detailed description and specifically pointed out in the appended claims, reference is had to the accompanying drawings for an illustrative embodiment of the invention, wherein:

FIG. 2 is a top plan view of the same;

FIG. 5 is a sectional view taken substantially upon the line 5—5 upon FIG. 2.

Figure 1:
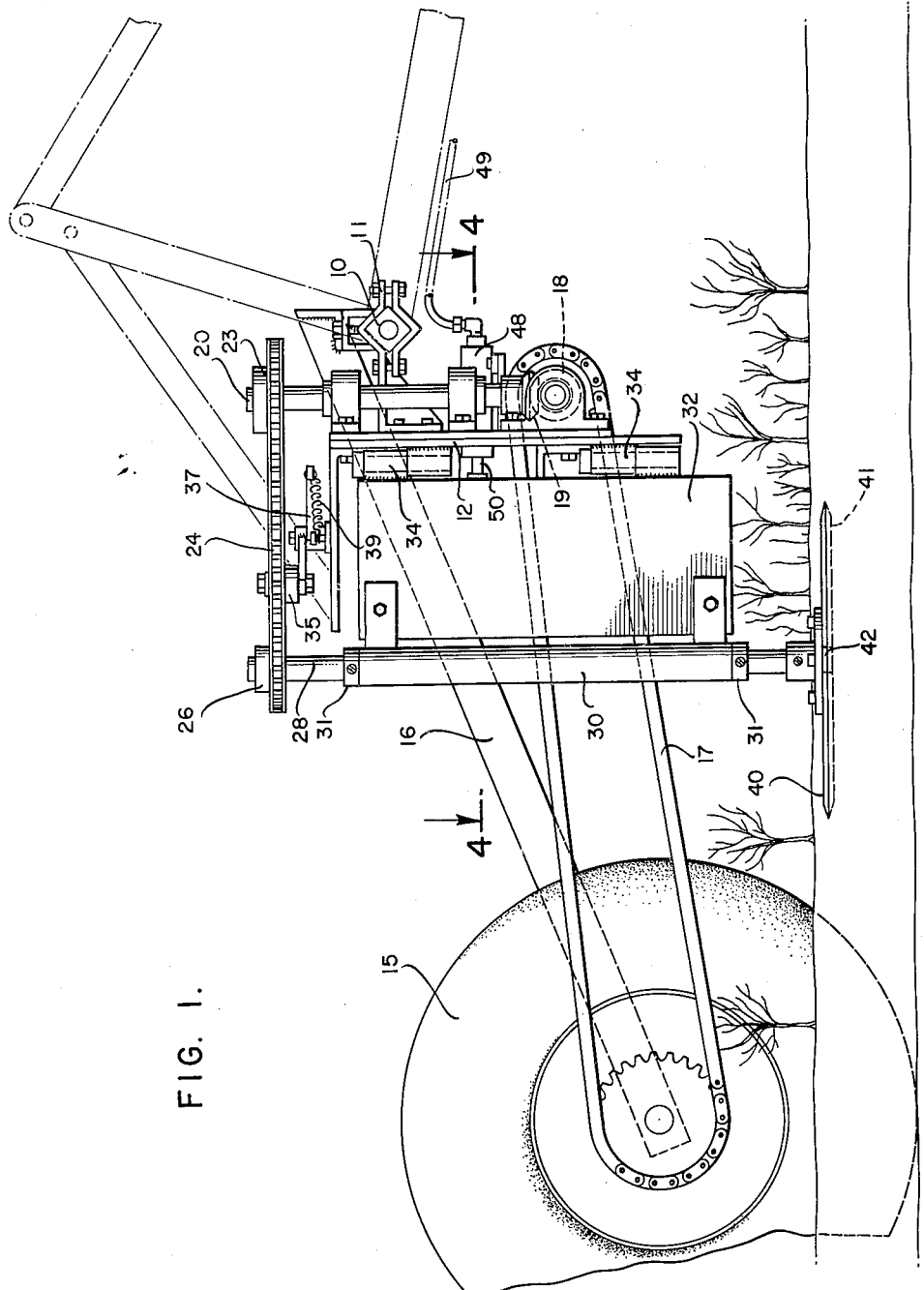
FIGURE 1 is a view in side elevation of apparatus embodying the present invention.
Figure 3:
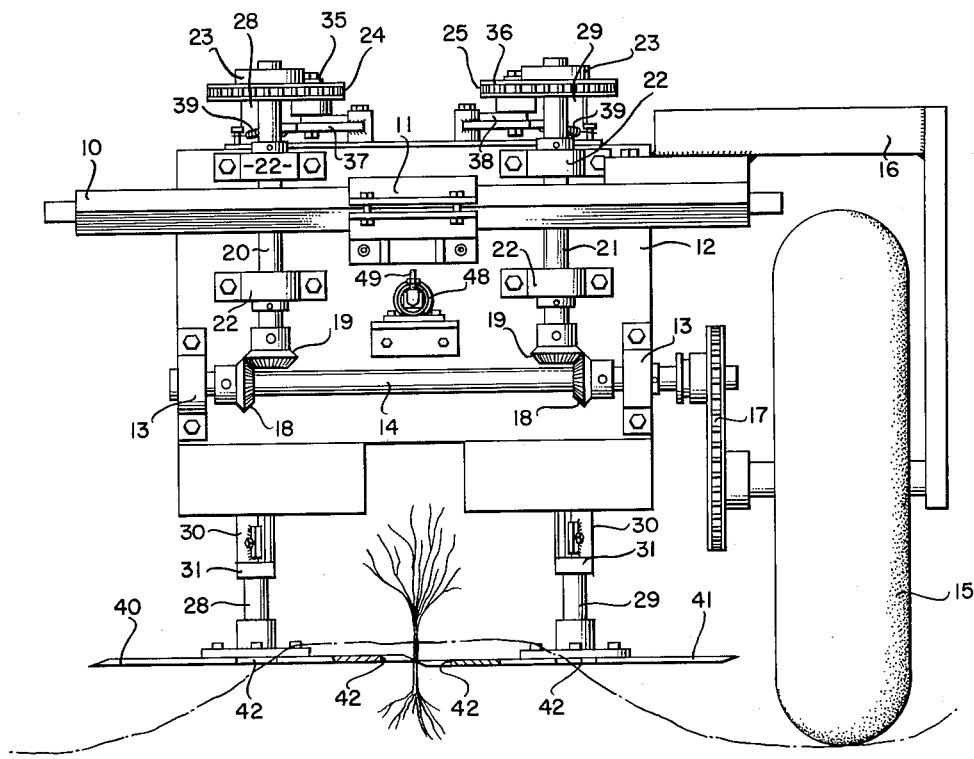
FIG. 3 is a front view in elevation of the same.

Referring to the accompanying drawings wherein similar reference characters designate similar parts throughout, the apparatus embodying the present invention is adapted to be mounted on the tool bar 10 of a tractor (not shown) by means of clamps 11 which are on and form a part of an upright frame 12. This frame serves to rotatably mount, by means of bearings 13, a horizontal rotary shaft 14. The shaft 14 is forcibly rotated either by a ground wheel 15 that is rotatably mounted on a bracket 16 mounted on the frame or the shaft 14 may be chain-driven from a part on the tractor. As illustrated, however, the shaft 14 is driven by means of a chain 17 off of the ground wheel 15.

On the shaft 14 there are miter gears 18 meshing with miter gears 19 on vertical shafts 20 and 21 which are rotatably mounted on the frame by means of bearings 22.

The tops of the shafts 20 and 21 are equipped with sprockets 23 over which are trained endless chains 24 and 25, respectively. These chains also extend around sprockets 26 and 27, respectively, on cutter shafts 28 and 29 which are rotatably mounted in bearings 30 and are equipped with collars 31. The bearings 30 are rigidly secured to cutter carriers 32 and 33, respectively, which are swingably mounted on the frame 12 by means of pins and knuckles 34. The cutter carriers are consequently mounted on the frame 12 for oscillatory movements about vertical axes disposed somewhat to the rear of the axes of rotation of the vertical shafts 20 and 21 and to accommodate such movement, slack is present in the endless chains 24 and 25 which is taken up by means of idler sprockets 35 and 36. These idler sprockets are rotatably mounted on bellcranks 37 and 38 that are pivotally mounted on the frame. Tension springs 39 connect the bellcranks to the frame and cause the idler sprockets 35 and 36 to continually maintain the chains 24 and 25 taut. These idler sprockets, however, may yield when the cutter carriers 32 and 33 swing outwardly.

On the lower ends of the cutter shafts 28 and 29 there are horizontal disc-like cutters 40 and 41. These disc-like cutters preferably have beveled edges and slightly overlap each other as illustrated in FIG. 2. At spaced intervals notches 42 are formed in the cutters which as the cutters rotate are brought into mutual registration with each other as shown in FIG. 2 so that a plant occupying the space formed by the notches will be retained and will not be thinned or cut.

Figure 4:
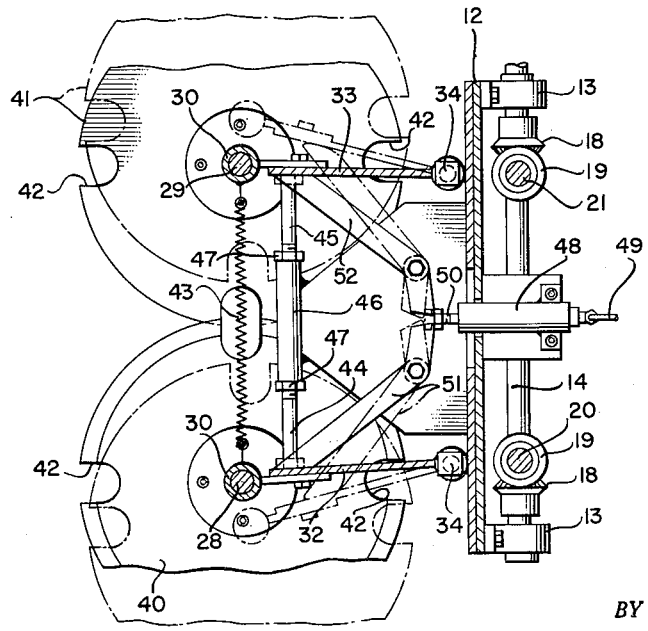
FIG. 4 is a horizontal section taken substantially upon the line 4—4 upon FIG. 1 in the direction indicated, and illustrating in dotted lines the positions assumed by parts when the blades are intentionally separated.

The cutter carriers are urged towards each other by means of a tension spring 43 connecting them, see FIG. 4, and stop bolts 44 and 45 are threaded into the ends of a knuckle 46 mounted on the frame and are held in adjusted positions by means of locknuts or jambnuts 47. These stops are consequently laterally adjustable and serve to limit the swinging movement of the cutter carriers 32 and 33 towards each other.

On the frame there is mounted a hydraulic cylinder 48 which is supplied with liquid under pressure through tubing 49 from the hydraulic take-off of the tractor and controlled by a valve, not shown. The piston in the cylinder is equipped with a piston rod 50, the head of which bears on the opposite ends of bellcranks 51 and 52. These bellcranks engage the inner or opposed faces of the cutter carriers 32 and 33. Whenever it is desired to force the cutter carriers to swing outwardly and thus separate the cutting blades 40 and 41, liquid under pressure is supplied to the cylinder 48 to actuate the piston therein. This swings the bellcranks 51 and 52 from the full-line positions shown in FIG. 4 to the dotted line positions, thus separating the blades 40 and 41. By merely releasing the pressure supplied to the cylinder 48 the blades may be returned to their full-line positions shown by means of the tension spring 43. Forcible separation of the blades may be required where the number of desired plants in a row is naturally quite thin and it is desired to retain all of the plants. Forcible separation may also be desirable where an immovable obstruction is apt to be encountered. Normally, however, the cutter carriers are urged by the spring 43 against their adjustable stops 44 and 45 and merely separate when occasion requires and are automatically returned to their normal position as soon as this can be accomplished.

It will be observed that the cutters are rotatable about vertical axes and that the cutter carriers likewise swing about vertical axes. In other words, a separation of the cutters does not involve a tilting of the axes of rotation of the cutter carriers. Consequently, the planes of the blades may be accurately adjusted by the tool bar 10 with relation to the top surface of the ground. Normally the planes of the blades are maintained at approximately ½" below the surface of the ground so as to cut unwanted plants and weeds below the ground surface and a sufficient distance down to prevent continued or re-growth.

As the tractor proceeds along a row, the gearing is such as to cause the peripheral speed of the cutting edges of the blades to be equal to ground speed so that in effect the cutters are merely rolling with relation to each other in the course of progressing down a row. If it is desired to alter the spacing between retained plants this can be accomplished by removing the cutter blades and substituting other cutter blades having different spacing of the notches 42. Either larger or smaller cutter blades may be substituted, in which case adjustment of the positions of the stops 44 and 45 should be made.

While I have illustrated only one apparatus embodying the present invention as having been mounted on the tool bar 10 of the tractor, it will be understood that any number of these devices may be mounted on the same tool bar. Usually four of my devices will be mounted on the same tool bar so that four rows of vegetation will be simultaneously thinned with each pass of the tractor.

Various changes may be made in the details of construction without departing from the spirit and scope of the invention as defined by the appended claims.

I claim:

1. A device of the class described comprising a frame, a power-driven shaft rotatably mounted upon the frame, vertical shafts rotatably mounted upon the frame and driven by the power-driven shaft, cutter supports swingably mounted upon the frame for swinging movement about vertical axes spaced from the axes of rotation of the vertical shafts, cutter shafts rotatably mounted upon the cutter supports, a chain drive between each cutter shaft and its corresponding vertical shaft, chain-tightening means mounted on the frame between each cutter shaft and its vertical shaft for maintaining the chains taut, means urging the cutter supports towards each other, means limiting the movement of the cutter supports towards each other, and notched cutters on the bottoms of the cutter shafts.

2. A device of the class described comprising a frame, a powder-driven shaft rotatably mounted upon the frame, vertical shafts rotatably mounted upon the frame and driven by the power driven shaft, cutter supports swingably mounted upon the frame for swinging movement about vertical axes independently of the vertical shafts, cutter shafts rotatably mounted upon the cutter supports, a chain drive between each cutter shaft and its corresponding vertical shaft, chain-tightening means mounted on the frame between each cutter shaft and its vertical shaft for maintaining the chains taut, means urging the cutter supports toward each other, means limiting the movement of the cutter supports towards each other, notched cutters on the bottoms of the cutter shafts, and means on the frame for causing the cutter supports to move away from each other when desired.

3. A device of the class described comprising a frame, a power-driven shaft rotatably mounted upon the frame, vertical shafts rotatably mounted upon the frame and driven by the power-driven shaft, cutter supports swingably mounted upon the frame for swinging movement about vertical axes spaced from the axes of rotation of the vertical shafts, cutter shafts rotatably mounted upon the cutter supports, a chain drive between each cutter shaft and its corresponding vertical shaft, an idler sprocket meshing with the chain of each chain drive, spring means urging the idler sprockets against the chains to maintain the chains taut, means urging the cutter supports towards each other, means limiting the movement of the cutter supports towards each other, and notched cutters on the bottoms of the cutter shafts.

4. A device of the class described comprising a frame, a power-driven shaft rotatably mounted on the frame, vertical shafts rotatably mounted upon the frame and driven by the power-driven shaft, cutter supports swingably mounted upon the frame for swinging movement about vertical axes spaced from the axes of rotation of the vertical shafts, cutter shafts rotatably mounted on the cutter supports, a chain drive between each cutter shaft and its corresponding vertical shaft, chain-tightening means mounted on the frame between each cutter shaft and its vertical shaft for maintaining the chains taut, means urging the cutter supports towards each other, means limiting the movement of the cutter supports towards each other, notched cutters on the bottoms of the cutter shafts, bellcranks mounted on the frame engageable with the cutter supports, and means for actuating said bellcranks to forcibly separate the cutter supports.

5. A device of the class described comprising a frame attachable to the tool bar of a tractor, a bracket on the frame, a groundwheel rotatably mounted on the bracket, a horizontal shaft rotatably mounted upon the frame, drive means between the groundwheel and the horizontal shaft for causing the horizontal shaft to be driven by the groundwheel when the groundwheel rolls on the ground, vertical shafts rotatably mounted upon the frame and operatively connected to the horizontal shaft so as to be driven thereby, a cutter support swingably mounted upon the frame rearwardly of each vertical shaft, a cutter shaft rotatably mounted at the rear end of each cutter support, a chain drive between each vertical shaft and its cutter shaft, chain-tightening means mounted along the frame between each vertical shaft and its cutter shaft, a notched cutter on the lower end of each cutter shaft, spring means urging each cutter shaft support toward the other cutter shaft support, stop means on the frame limiting the extent to which each cutter support may approach the other, and means on the frame for forcibly separating the cutter supports.

6. A device of the class described comprising a frame attachable to the tool bar of a tractor, a bracket on the frame, a groundwheel rotatably mounted on the bracket, a horizontal shaft rotatably mounted upon the frame, drive means between the groundwheel and the horizontal shaft for causing the horizontal shaft to be driven by the groundwheel when the groundwheel rolls on the ground, vertical shafts rotatably mounted upon the frame and operatively connected to the horizontal shaft so as to be driven thereby, a cutter support swingably mounted upon the frame rearwardly of each vertical shaft, a cutter shaft rotatably mounted on the rear end of each cutter support, a chain drive between each vertical shaft and its cutter shaft, chain-tightening means mounted along the frame between each vertical shaft and its cutter shaft, a notched cutter on the lower end of each cutter shaft, spring means urging each cutter shaft support toward the other cutter shaft support, stop means on the frame limiting the extent to which each cutter support may approach the other, a hydraulic cylinder and piston on the frame, and bellcranks pivotally mounted on the frame operable by the piston to forcibly separate the cutter supports.

References Cited in the file of this patent

UNITED STATES PATENTS

| | | |
|---|---|---|
| 416,880 | Whitehead | Dec. 10, 1889 |
| 842,727 | Tucker | Jan. 29, 1907 |
| 1,055,628 | Freeman | Mar. 11, 1913 |
| 1,581,404 | Smith | Apr. 20, 1926 |
| 2,393,122 | Schwindt et al. | Jan. 15, 1946 |
| 2,764,077 | Pertics et al. | Sept. 25, 1956 |